United States Patent [19]

Matsumura et al.

[11] Patent Number: 5,239,477
[45] Date of Patent: Aug. 24, 1993

[54] CONVERSATIONAL-TYPE PROGRAMMING APPARATUS CLASSIFYING BY COLOR REGIONS TO BE MACHINED

[75] Inventors: Teruyuki Matsumura, Hachioji; Takahiko Mineshige, Oshinomu, both of Japan

[73] Assignee: Fanuc Ltd., Minamitsuru, Japan

[21] Appl. No.: 902,809

[22] Filed: Jun. 25, 1992

Related U.S. Application Data

[63] Continuation of Ser. No. 309,799, Feb. 8, 1989, filed as PCT/JP88/00736, Jul. 21, 1988, abandoned.

[30] Foreign Application Priority Data

Jul. 24, 1987 [JP] Japan .................. 62-184988

[51] Int. Cl.⁵ .................. G06F 15/46; G05B 19/42
[52] U.S. Cl. .................. 364/474.22; 364/191
[58] Field of Search .......... 364/146, 188–193, 364/474.01–474.33; 340/703, 709, 715, 734; 395/131

[56] References Cited

U.S. PATENT DOCUMENTS

| | | | |
|---|---|---|---|
| 4,521,860 | 6/1985 | Kanematsu et al. | 364/474.21 |
| 4,524,414 | 6/1985 | Kiyokawa | 364/474.22 |
| 4,571,670 | 2/1986 | Kishi et al. | 364/474.26 |
| 4,648,028 | 3/1987 | DeKlotz et al. | 364/474.22 |
| 4,714,920 | 12/1987 | Andernach et al. | 364/474.22 |
| 4,734,845 | 3/1988 | Kawamura et al. | 364/474.26 |
| 4,757,461 | 7/1988 | Stohr et al. | 364/518 |
| 4,791,575 | 12/1988 | Watts, Jr. et al. | 364/474.29 |
| 4,821,201 | 4/1989 | Kawamura et al. | 364/474.2 |
| 4,879,667 | 11/1989 | Gorski et al. | 364/474.24 |

OTHER PUBLICATIONS

Patent Abstract of Japan, vol. 7, No. 221, Sep. 30, 1983, JP-A-58 114839 (Yamazaki Tekkosho) Jul. 8, 1983.
Patents Abstracts of Japan, vol. 7, No. 272, Dec. 16, 1983, JP-A-58 159107 (Mitsubishi Denki) Sep. 21, 1983.

*Primary Examiner*—Jerry Smith
*Assistant Examiner*—Jim Trammell
*Attorney, Agent, or Firm*—Staas & Halsey

[57] ABSTRACT

A conversational-type programming apparatus according to the invention originates an NC tape for a numerically controlled (NC) machine tool or the like. In a case where a plurality of machining operations are defined for one region of a blank, a color corresponding to a type of machining designated by the latest machining step is displayed on a screen. Therefore, even when a machining operation for the same blank is defined for a plurality of regions of the blank, it is possible to readily distinguish the machining type designated for each region based on the displayed colors of the regions.

3 Claims, 2 Drawing Sheets

CONVERSATIONAL-TYPE PROGRAMMING APPARATUS CLASSIFYING BY COLOR REGIONS TO BE MACHINED

This application is a continuation of application No. 07/309,799, filed Feb. 8, 1989, filed PCT/JP88/00736, Jul. 21, 1988, now abandoned.

BACKGROUND OF THE INVENTION

1. Field of the Invention This invention relates to a conversational type programming apparatus which originates a numerical control (NC) tape for a numerically controlled (NC) machine tool or the like.

2. Description of the Related Art

Automatic programming for originating an ordinary NC tape utilizes an electronic computer to enter a tool path and other machining conditions on an NC tape based on a design drawing. In order to shorten the time from origination of a part program to completion of the NC tape and reduce programming errors, various conversational-type automatic programming apparatus having a CRT or other display function have been developed.

According to the process through which NC statements are generated by a conversational-type automatic programming apparatus, system data conforming to the type of machine tool is read in from a magnetic tape cassette, and use is made of a variety of data files stored at such time. More specifically, an operator causes a CRT to display various conversational-type data read and written while referring to a file, and originates a part program while observing the display. Meanwhile, processing is executed by the programming apparatus each time one line of the part program is entered. This is stored in memory as an NC program step.

In a case where a C-axis machining step is created for performing predetermined machining such as drilling a hole in the end face of a workpiece with the conversational automatic programming apparatus of the above type, the conventional practice is to define a C-axis profile which perpendicularly intersects the Z axis of the blank profile on a blank profile display screen. Next, a cursor is moved to a predetermined region of the defined C-axis profile and the particulars of a predetermined machining operation are selected. Whereupon the color in which the region corresponding thereto is displayed temporarily changes, informing the operator of the fact that the part program has been created.

The data file utilized in this case is formed as a separate data file depending upon the type of machining, such as counter-boring, drilling and tapping, even if the C-axis machining is the same. Accordingly, since the displayed color of the predetermined region of the blank temporarily changes at the moment one machining definition procedure from among the definition procedures ends, the operator can readily determine, on a region-by-region basis, whether a machining step regarding a machining type specified for each region has already been created.

However, with regard to origination of a machining program in which a C-axis profile is defined by a plurality of machining types, if machining which will not cause a change in the blank profile itself is selected, the displayed color indicating the region for which machining has been completed will vanish each time the data file is updated, and the color of the display will return to that of the original blank profile. As a result, the machining step will no longer be visually distinguishable. Furthermore, when a C-axis profile defined with regard to the same blank extends over a plurality of locations, the data files are read out in succession and it is particularly difficult to specify a region of the blank that is to be machined based thereon. In other words, with regard to situations in which only the displayed color of a profile temporarily changes without an accompanying change in the profile on the display screen, as in the case of counter-boring, drilling and tapping, it becomes difficult for the operator to understand the display when a program is created.

SUMMARY OF THE INVENTION

The present invention has been devised in order to solve the foregoing problems and its object is to provide a conversational-type programming apparatus in which, with regard to a region of a blank for which a machining type has been designated, the displayed color thereof is made different for each defined machining type when displaying the profile of the blank.

In accordance with the present invention, there is provided a conversational-type programming apparatus in which machining steps of a program to be executed are successively input from a profile display screen of a blank profile, comprising program originating means for specifying a predetermined region of the blank and designating a type of machining performed at the region, memory means for storing a programmed machining type for each region of the blank, and display color control means for classifying by color a machining type which has been designated by the latest machining step, based upon the stored machining particulars, and displaying the machining type on the profile display screen.

Accordingly, the conversational-type programming apparatus of the present invention is such that, when a plurality of machining operations are defined for one region of a blank, a color corresponding to a machining type designated by the latest machining step is displayed on the screen. Therefore, even when a machining operation for the same blank is defined for a plurality of regions of the blank, it is possible to readily distinguish the machining type designated for each region based on the displayed colors of the regions.

DESCRIPTION OF THE PREFERRED EMBODIMENT

An embodiment of the present invention will now be described in detail with reference to the drawings.

Figure 1:
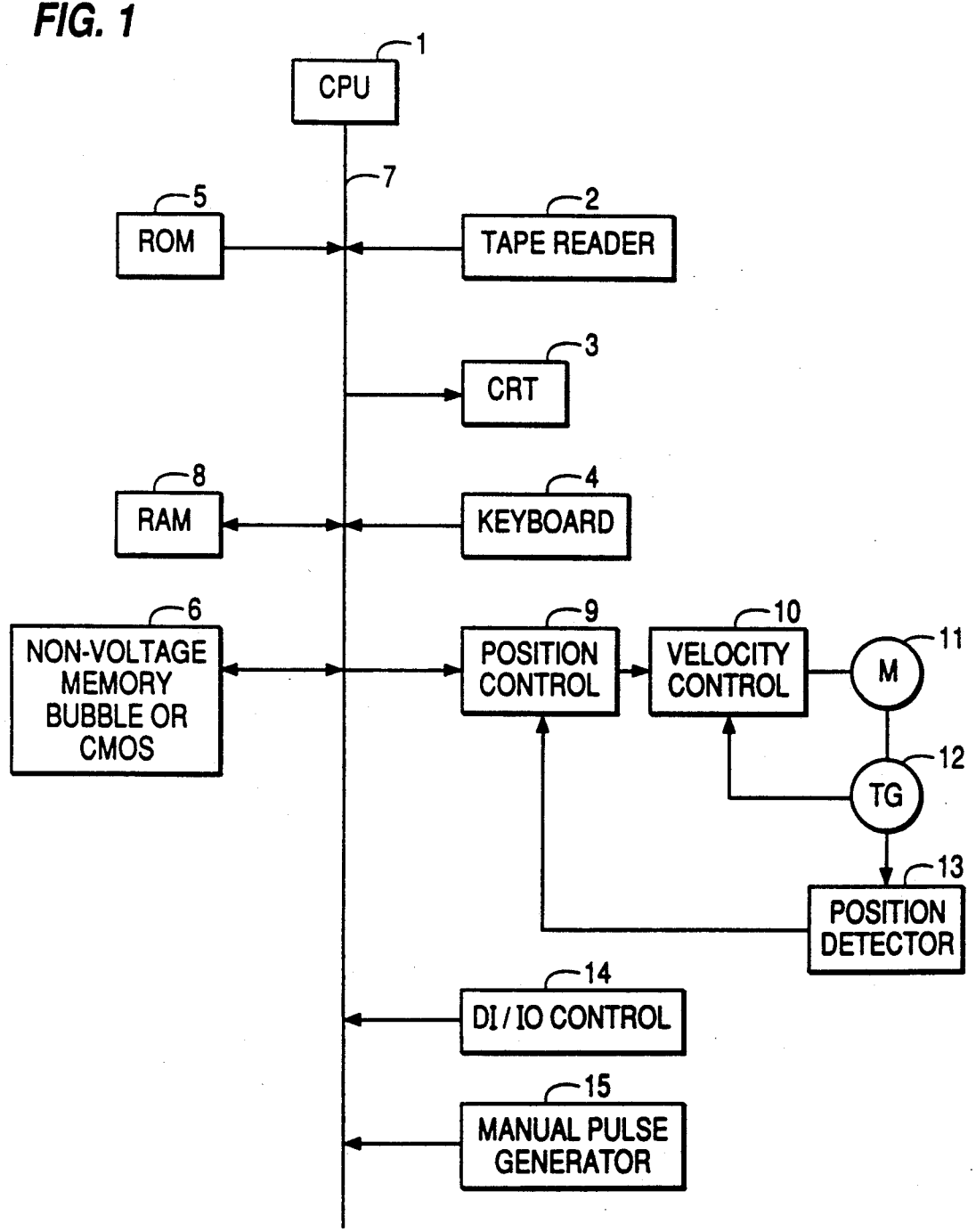
FIG. 1 is a block diagram of an embodiment according to the present invention.

FIG. 1 is a block diagram of a conversational-type automatic programming apparatus which is used along with an NC apparatus. Connected to a processing unit (CPU) 1 are a tape reader 2 for reading NC commands from an NC tape, a CRT 3 for displaying program information, machine-side operations and the like, and a keyboard 4 for manually inputting data for the purpose of program revision and the like. Also provided are a ROM 5 for storing various control programs for running the system. The ROM 5 includes the NC apparatus, and a non-volatile memory 6 for storing, in file format, a part program which stores, according to a part, the control program for subjecting a part to milling or the like, or various data necessary for machining.

A RAM 8, which has a read/write capability, is connected to a bus line 7 of the CPU 1, and is used as a working memory when a motor 11 of a movable element of a machine tool is controlled by the CPU 1 via position control means 9 and velocity control means 10; or is employed in control of the display screen of CRT 3. The motor 11 has a velocity detecting tachogenerator (TG) 12 and a position detector 13 which respectively feed back actual velocity and present position in response to a command signal from the CPU 1. An exchange of signals between the CPU and peripheral equipment including the machine tool is controlled by an input/output controller (DI/DO controller) 14 via the bus line 7; The movable element of the machine tool can be made to execute a predetermined manual operation by a manual pulse generator 15.

Figure 2B:
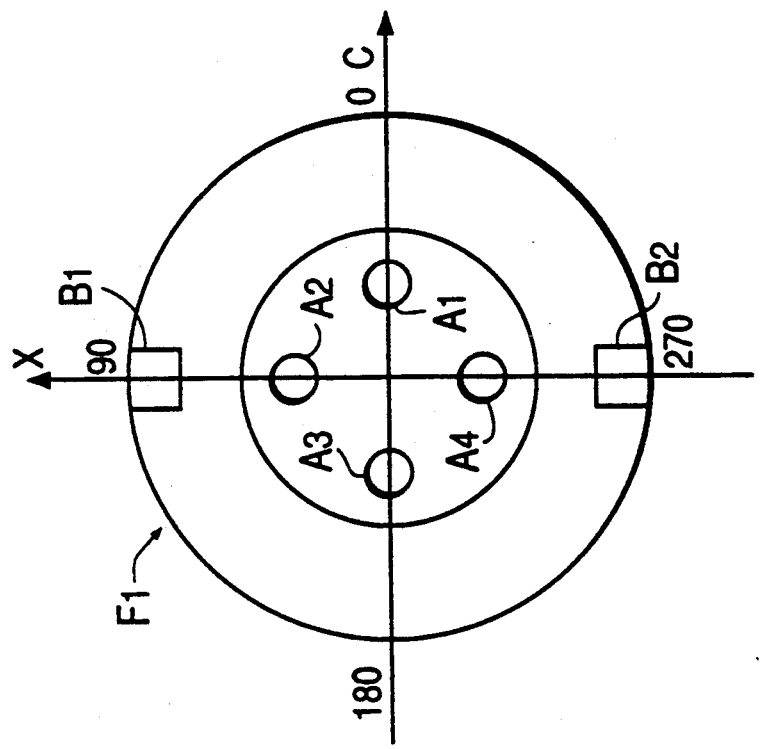
FIGS. 2a and 2b are diagrams of an example of a display screen.
Figure 2A:
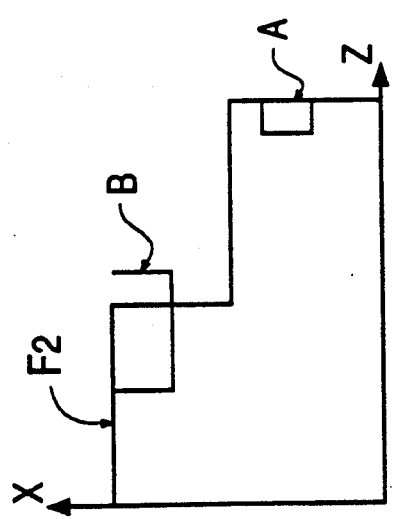

FIG. 2 is an example of a C-axis profile definition display for conversational-type automatic programming. A profile $F_1$ (C-axis profile) of the end face of a blank and a profile $F_2$ of a cross section of the blank in a plane defined by Z and X axes are displayed by white-colored lines on the screen called to the CRT 3. Four end-face holes $A_1$–$A_4$ and side-face longitudinal grooves $B_1$ and $B_2$ are defined on the screen.

First, when a counterboring machining process is selected from the display and an NC program is created, the corresponding file is called from the non-volatile memory 6. A cursor is placed at the positions of the four end-face holes and a predetermined key input is made. As a result, each of the regions of the blank successively change to the color green on the screen of the CRT 3 based on the display control data in RAM 8. Next, when a drilling machining process number is entered and a machining step is generated while each region is specified by a separate file, the green display color of the displayed end-face hole changes to red on each occasion. Thereafter, when a tapping machining process is selected and a program for applying tapping machining to the four end-face holes is input in similar fashion, the displayed colors change to yellow. Finally, upon confirming the end of machining definition for each of the end-face holes, the operator selects a grooving machining process and inputs a machining step regarding the longitudinal grooves in the side face.

In a case where a plurality of machining types are designated in such C-axis machining, there are instances where the progress of machining on the screen cannot be recognized as a change in the profile of the blank. However, in the present invention it is arranged so that different colors are decided in accordance with a machining type so that the end of definition in each process can readily be distinguished on the display screen. The present invention is particularly advantageous in a case where, say, a specific one of the end-face holes $A_1$–$A_4$ is subjected to tapping.

The invention is useful not only in this C-axis machining programming but also in the creation of programs regarding types of machining in which the stage of progress cannot be visualized from the display of the blank profile.

With the apparatus of the embodiment described above, the color of the region of a defined profile on a profile display screen changes, and a change in the profile due to actual machining is displayed as a change in color on the screen and is stored in memory. Regions of the defined profile are each displayed in a predetermined color on the display screen also when a transition is made to a program step regarding the next machining type. As a result, the operator is capable of distinguishing this visually and can readily select a prescribed region. Thus, since colors are made different for each and every type of machining, the stage of progress of machining can readily be distinguished. This is advantageous when defining a plurality of machining operations for one region. Moreover, even if there are a plurality of locations at which a profile is defined, it is possible to clearly recognize how far the definition of machining at each region has progressed. This is desirable also in terms of preventing machining procedure setting errors.

Though an embodiment of the present invention has been described, the invention is not limited thereto but can be modified in a variety of ways without departing from the scope of the claims.

The conversational-type programming apparatus of the present invention is adapted such that a display classified by color for each type of machining is presented with regard to regions of a blank for which types of machining have already been defined. This makes it possible to readily specify a region of a blank to be machined based on a called data file.

We claim:

1. A conversational-type programming apparatus in which machining steps of a program to be executed are successively input from a profile display screen of a blank profile, said apparatus comprising:
   program originating means for specifying a predetermined region of the blank profile and designating a type of machining performed at said predetermined region;
   memory means for storing a program machining type for each region of the blank profile; and
   display color control means, coupled to said memory means, for classifying by color regions to be machined, displaying a color corresponding to a machining type which has been designated by the latest machining step, based upon said stored programmed machining type, and displaying said color changes of said machining types and sectional views on the profile display screen after each machining step and storing said changes in said memory.

2. A conversational-type programming apparatus according to claim 1, wherein said program originating means generates a C-axis machining step of the blank profile.

3. A conversational-type programming apparatus according to claim 1, wherein said display screen includes at least two different angle blank profiles.

* * * * *